United States Patent
Mazur et al.

(10) Patent No.: US 9,481,338 B2
(45) Date of Patent: Nov. 1, 2016

(54) METHOD OF MANUFACTURING A TRIM COMPONENT WITH HIDDEN TEAR PATTERN AND TRIM COMPONENT WITH HIDDEN TEAR PATTERN

(71) Applicant: GM GLOBAL TECHNOLOGY OPERATIONS LLC, Detroit, MI (US)

(72) Inventors: Lorin A. Mazur, Shelby Township, MI (US); Jeffrey T. Kinser, Lake Orion, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 14/692,022

(22) Filed: Apr. 21, 2015

(65) Prior Publication Data
US 2016/0121837 A1    May 5, 2016

Related U.S. Application Data

(60) Provisional application No. 62/073,253, filed on Oct. 31, 2014.

(51) Int. Cl.
| | |
|---|---|
| B60R 21/2165 | (2011.01) |
| B60R 13/02 | (2006.01) |
| B29C 44/06 | (2006.01) |
| B32B 5/14 | (2006.01) |
| B32B 5/20 | (2006.01) |
| B32B 7/02 | (2006.01) |
| B32B 3/26 | (2006.01) |
| B32B 1/00 | (2006.01) |

(52) U.S. Cl.
CPC ........... *B60R 21/2165* (2013.01); *B29C 44/06* (2013.01); *B32B 3/266* (2013.01); *B32B 5/142* (2013.01); *B32B 5/20* (2013.01); *B32B 7/02* (2013.01); *B60R 13/02* (2013.01); *B32B 1/00* (2013.01); *B32B 2250/22* (2013.01); *B32B 2266/02* (2013.01); *B32B 2266/025* (2013.01); *B32B 2266/0221* (2013.01); *B32B 2266/0235* (2013.01); *B32B 2266/0278* (2013.01); *B32B 2307/402* (2013.01); *B32B 2307/536* (2013.01); *B32B 2605/00* (2013.01); *B32B 2605/003* (2013.01); *B60R 2013/0287* (2013.01)

(58) Field of Classification Search
CPC .................. B60R 21/2165; B60R 2013/0287; B60R 13/02; B29C 44/06; B05D 5/00; B05D 2350/60
USPC ....................................................... 264/46.4
See application file for complete search history.

(56) References Cited

U.S. PATENT DOCUMENTS

| | | | |
|---|---|---|---|
| 5,632,914 A | 5/1997 | Hagenow et al. | |
| 6,348,172 B1 * | 2/2002 | Barnes ................ | B29C 37/0057 264/299 |
| 6,352,658 B1 * | 3/2002 | Chang ................. | B29C 44/0461 264/255 |

(Continued)

*Primary Examiner* — Drew Brown
(74) *Attorney, Agent, or Firm* — Quinn Law Group

(57) ABSTRACT

A method of manufacturing a trim component includes forming a skin layer of the trim component, and spraying a foam layer on the skin layer according to a first spray pattern that establishes a first gap in the foam layer arranged as a predetermined tear pattern. The skin layer extends across the first gap. A corresponding trim component has a skin layer with an outer surface and an inner surface opposite the outer surface, and a foam layer sprayed on the inner surface of the skin layer according to a predetermined spray pattern so that the foam layer has a first gap arranged as a predetermined tear pattern, with the skin layer extending across the first gap.

18 Claims, 2 Drawing Sheets

(56) References Cited

U.S. PATENT DOCUMENTS

| | | | |
|---|---|---|---|
| 6,753,057 B1* | 6/2004 | Gardner, Jr. | B29C 37/0057 280/728.3 |
| 7,344,666 B2* | 3/2008 | Cowelchuk | B29C 70/086 264/255 |
| 7,354,060 B2 | 4/2008 | Thomas | |
| 7,615,177 B2* | 11/2009 | Izumi | B60R 21/2165 264/255 |
| 2002/0053750 A1* | 5/2002 | Schwaighofer | B29C 44/1214 264/46.4 |
| 2003/0042643 A1* | 3/2003 | Lammon | B29C 44/086 264/46.4 |
| 2004/0164531 A1* | 8/2004 | Riha | B29C 59/16 280/732 |
| 2010/0219662 A1* | 9/2010 | Schirmer | B29C 37/0057 296/191 |
| 2014/0265267 A1* | 9/2014 | O'Gara | B60R 21/2165 280/728.3 |

* cited by examiner

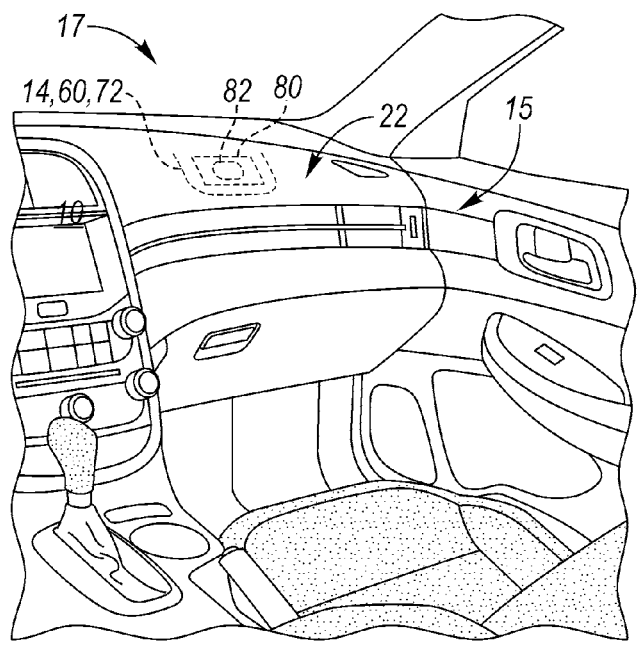
FIG. 4
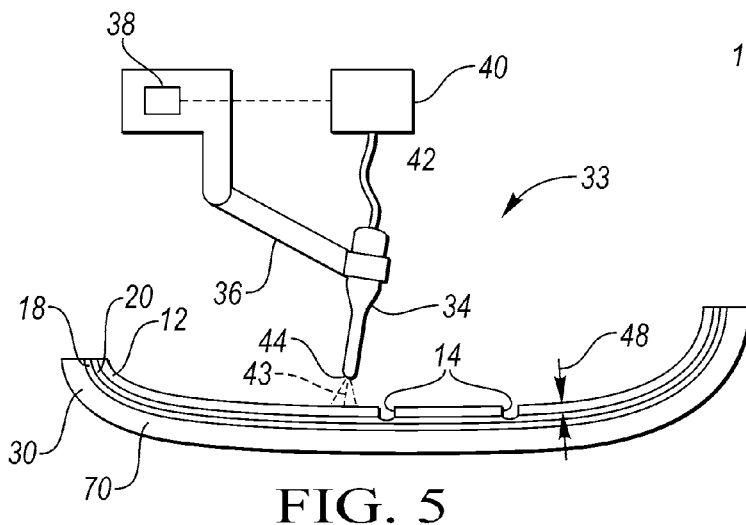
FIG. 5
FIG. 6
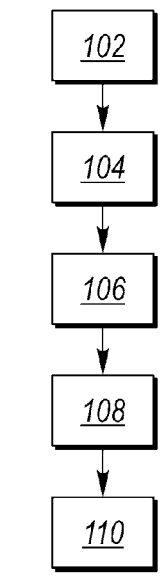
FIG. 7

METHOD OF MANUFACTURING A TRIM COMPONENT WITH HIDDEN TEAR PATTERN AND TRIM COMPONENT WITH HIDDEN TEAR PATTERN

CROSS REFERENCE TO RELATED APPLICATION

This application claims the benefit of U.S. Provisional Application Ser. No. 62/073,253, filed Oct. 31, 2014, which is hereby incorporated by reference in its entirety.

TECHNICAL FIELD

The present teachings relate to a method of manufacturing trim components, and to trim components, such as vehicle interior trim components.

BACKGROUND

Trim components, such as vehicle interior trim components, generally include a variety of different materials that may be layered or otherwise arranged to provide desired aesthetics, compressibility to the touch, and structural support. Vehicle trim components are sometimes provided with a tear seam, which is an intentional stress concentration causing tearing of the trim component at the tear seam when an air bag is deployed through the trim component. Providing the tear seam may involve stitching portions of the trim component to one another. Some tear seams are hidden, as they are provided only on a side of the trim component not visible from the passenger compartment. These tear seams may be provided by mechanically cutting or laser cutting a score in the trim panel after assembly of the trim panel and prior to installation of the trim panel in the vehicle.

SUMMARY

A method of manufacturing a trim component includes forming a skin layer of the trim component, and spraying a foam layer on the skin layer according to a first spray pattern that establishes a first gap in the foam layer. The foam layer is arranged as a predetermined tear pattern. Accordingly, no post-production cutting step is required to provide the predetermined tear pattern. Moreover, the skin layer extends across the first gap so that the predetermined tear pattern may be hidden from view if the trim component is installed in a vehicle with the outer surface of the skin layer facing toward the passenger compartment. An air bag module with a deployable air bag can be placed adjacent the tear pattern at an inner surface of the trim component. The predetermined tear pattern can thus be referred to as an "invisible" tear pattern, or as an invisible air bag door tear pattern as it will not be viewable or otherwise apparent from the passenger compartment prior to air bag deployment.

A substrate may be disposed on the foam layer, and may have a second gap that can be at least partially aligned with and may be coextensive with the first gap. Optionally, the skin layer can include an outer skin layer and an inner skin layer. The inner skin layer can be provided with a third gap under the method, such as by spraying the inner skin layer according to a second spray pattern. The third gap can be at least partially aligned with and may be coextensive with the first gap. The aligned first, second, and third gaps can establish the predetermined tear pattern, and the outer skin layer will extend across the aligned first, second, and third gaps.

A corresponding trim component has a skin layer with an outer surface and an inner surface opposite the outer surface, and a foam layer sprayed on the inner surface of the skin layer according to a predetermined spray pattern so that the foam layer has a first gap arranged as a predetermined tear pattern, with the skin layer extending across the first gap. The skin layer can include the outer skin layer and the inner skin layer. The trim component may also include the substrate.

The above features and advantages, and other features and advantages, of the present teachings are readily apparent from the following detailed description of some of the best modes and other embodiments for carrying out the present teachings, as defined in the appended claims, when taken in connection with the accompanying drawings.

BRIEF DESCRIPTION OF THE DRAWINGS

FIG. 4 is a schematic illustration in fragmentary perspective view of the trim component of FIG. 1 installed in a vehicle.

FIG. 5 is a schematic illustration in plan view of an assembly that includes a spray foam tool head and is for manufacturing the trim component of FIG. 1 or FIG. 3.

FIG. 6 is a schematic illustration in fragmentary back view of a foam layer of the trim component of FIG. 1 showing a predetermined spray pattern established by the spray foam tool head of FIG. 5.

FIG. 7 is a flow diagram of a method of manufacturing the trim component of FIG. 1 or FIG. 3.

DETAILED DESCRIPTION

Figure 1:
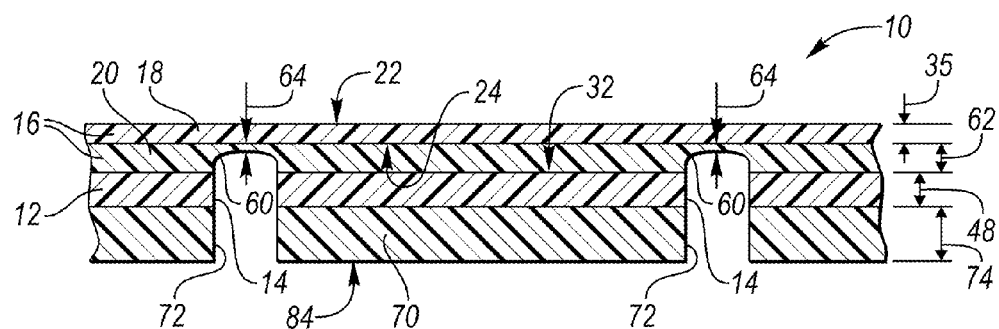
FIG. 1 is a schematic illustration in fragmentary cross-sectional view of a portion of a trim component taken at lines 1-1 in FIG. 2.

Referring to the drawings, wherein like reference numbers refer to like components, FIG. 1 shows a multi-layer trim component 10. As further discussed herein, the multi-layer trim component 10 includes a foam layer 12 that is sprayed according to a first predetermined spray pattern P shown in FIG. 6 to establish a first gap 14 in the foam layer 12. The first gap 14 serves as a predetermined tear pattern for the trim component 10. The trim component 10 is manufactured according to a method 100 shown in FIG. 7 with a reduced number of steps in comparison to known manufacturing operations. For example, no cutting step is required to create the predetermined tear pattern.

A skin layer 16 covers the first gap 14 so that the first gap 14 is not visible from an outer surface 22 of the multi-layer trim component 10. In the embodiment shown, the trim component 10 is a vehicle instrument panel. In other embodiments, the trim component 10 could be a vehicle door, or a non-vehicle trim component, such as an item of furniture. For example, when the first gap 14 establishes the shape of an air bag door opening, so that the predetermined tear pattern is an air bag door tear pattern in an instrument panel, vehicle door, or other vehicle interior component, the predetermined tear pattern is hidden from view in the passenger compartment 15 of the vehicle 17 of FIG. 4. As is understood by those of ordinary skill in the art, a tear pattern establishing a door opening for an air bag is a relatively weakened area of a trim component that creates a stress concentration at the tear pattern when force is applied to the trim component. Accordingly, the trim component tends to open at the tear pattern when the air bag is deployed. In known trim components in which the stress concentration is created by a sewn seam, the tear pattern is referred to as a tear seam. As used herein, a vehicle includes motor vehicles, such as automotive vehicles, motorcycles, and trucks, as well as trains, airplanes, marine vehicles, and other motive vehicles.

FIG. 1 shows the multi-layer trim component 10 having distinct layers. The skin layer 16 includes an outer skin layer 18 and an inner skin layer 20. The outer skin layer 18 has an outer surface 22, and an inner surface 24 opposite the outer surface 22. The outer surface 22 may be exposed and viewable from inside the passenger compartment 15 when the trim component 10 is installed as the instrument panel in the vehicle 17 of FIG. 4. Optionally, a protective coating can be applied to cover the outer surface 22.

The skin layer 16 can be formed in a tool 30 that may be a form and/or a molding tool generally having the shape of the trim component 10, as shown in FIG. 5. The outer skin layer 18 and the inner skin layer 20 can be a variety of materials. In one embodiment, both the outer skin layer 18 and the inner skin layer 20 are a sprayed urethane material, and may be the same or different urethane materials. For example, each may be a urethane material having a different physical property, such as a different hardness, thickness, color, texture, or composition. The outer skin layer 18 may be referred to as a color coat, as it may be used to impart a desired color to the trim component 10. The inner skin layer 20 may be referred to as a structural coat, as it is thicker than the outer skin layer 18 to provide structural support. The inner skin layer 20 can have a thickness 62 from about 0.4 millimeters (mm) to about 6 mm, and can add a cushioned feel to the outer skin layer 18. In one embodiment, the outer skin layer 18 can have a thickness 35 from about 0.1 mm to 3 mm.

The outer skin layer 18 can be formed by spraying the urethane material so that the outer surface 22 is against the tool 30. The outer skin layer 20 can have a desired color, texture, or pattern. The texture or pattern can be imparted by the tool 30 or can be created by another mechanical or thermal process.

The inner skin layer 20 can then be applied in the tool 30 against the inner surface 24 of the outer skin layer 18. In an embodiment in which the inner skin layer 20 is a sprayed urethane foam, the inner skin layer 20 is applied by spraying, and an outer surface 32 of the inner skin layer 20 can bond to the inner surface 24 of the inner skin layer 20 during spraying, without adding binding adhesives on the outer skin layer 18. As an alternative to sprayed urethane foam, the outer skin layer 18 and the inner skin layer 20 can be other types of materials such as, without limitation, polyurethane, thermoplastic, ethylene vinyl acetate (EVA) foam, expanded foam, polyethylene, polyvinyl chloride (PVC), or a bio-based foam material.

The foam layer 12 may be referred to as a structural foam layer or a foam backer layer and provides additional thickness, cushioning and compressibility to the trim component 10. In one non-limiting example embodiment, the foam layer 12 can have a thickness from about 0.5 mm to about 8 mm and can be of the same or different material as the outer skin layer 18 and the inner skin layer 20.

After forming the skin layer 16, the foam layer 12 can then be sprayed on the inner skin layer 20. The foam layer 12 is sprayed according to a first spray pattern P, shown in FIG. 6, that establishes the first gap 14 in the foam layer 12 arranged as a predetermined tear pattern of the trim component 10. An example assembly 33 for manufacturing the trim component 10 or 10A is shown in FIG. 5. The assembly 33 includes a spray foam tool head 34 movable according to a controlled pattern of movements by a robotic arm 36. An electronic controller 38 is operatively connected to the robotic arm 36 to control movement of the robotic arm 36 according to a stored algorithm. Those skilled in the art will readily understand the use of robotic arms to aid in manufacturing of trim components. The electronic controller 38 is also operatively connected to a spray foam source 40 that may include the components of the spray foam material, a pump and a proportioner for pressurizing and metering the components of the spray foam material through a hose 42 to the spray foam tool head 34. Accordingly, the electronic controller 38 also controls the flow of the spray foam 43 through nozzle 44 of the spray foam tool head 34 and can stop and start the flow during movement of the tool head 34.

The electronic controller 38 controls movement of the spray foam tool head 34 according to a predetermined pattern that may create a thickness 48 of the foam layer 12 (shown in FIG. 1) that is generally uniform except at the first gap 14. By moving the spray foam tool head 34 in the direction of arrows 50 in FIG. 6, the predetermined spray pattern P is established. Other controlled movements of the spray foam tool head 34 can alternatively be used to create the first gap 14, and movement in the direction of arrows 50 is only one nonlimiting example. The spray foam tool head 34 does not spray in the area 52 surrounded by the pattern P, thereby creating the first gap 14. Stated differently, the first gap 14 is an area 52 where spray foam is intentionally omitted according to the stored algorithm controlling movement of the spray foam tool 34. The first gap 14 extends through the foam layer 12 to the inner skin layer 20. In contrast, the area 54 outside of the arrows 50 creating the spray pattern P is substantially uniformly covered with foam sprayed from the spray foam tool head 34. The spray foam tool head 34 can be controlled to move in any suitable pattern to cover the area 54, and the pattern of movement of the spray foam tool head 34 over the area 54 is not indicated in FIG. 6 for clarity in the drawing. For example, the spray foam tool head 34 could be controlled to move in additional U-shaped patterns immediately around the first spray pattern P, and linearly as necessary further from first spray pattern P to cover the entire area 54 without turning off the flow of spray foam 43 during spraying of the foam layer 12. Alternatively, the spray foam tool head 34 could be controlled to move linearly back and forth from left to right then from right to left, spraying across area 54, and turning off the flow of spray foam 43 over the area 52.

As indicated in FIGS. 1 and 6, optionally, the inner skin layer 20 can also be sprayed according to a predetermined second spray pattern so that an additional gap 60 at least partially aligned with and overlapping the first gap 14 is formed in the inner skin layer 20. The additional gap 60 is also referred to herein as a third gap. In the embodiment shown, the second spray pattern of the inner skin layer 20 tracks the same path as arrows 50 of the first spray pattern P, but sprays a reduced amount of foam in the area aligned with the area 52. As shown in FIG. 1, the additional gap 60 therefore extends only partway through a thickness 62 of the inner skin layer 20, resulting in a thinned portion 64 of the inner skin layer 20. The thinned portion 64 is generally in the same U-shape as the first gap 14 in the embodiment shown. In other words, the first gap 14 and the third gap 60 are substantially aligned and substantially coextensive. The third gap 60 is sprayed prior to the gap 14, as the inner skin layer 20 is applied to the outer skin layer 18 prior to spraying the foam layer 12 on the inner skin layer 20. The outer skin layer 18 extends across the third gap 60 and the first gap 14, as shown in FIG. 1, so that the gaps 14, 60 are not viewable from the outer surface 22 of the outer skin layer 18.

Figure 2:
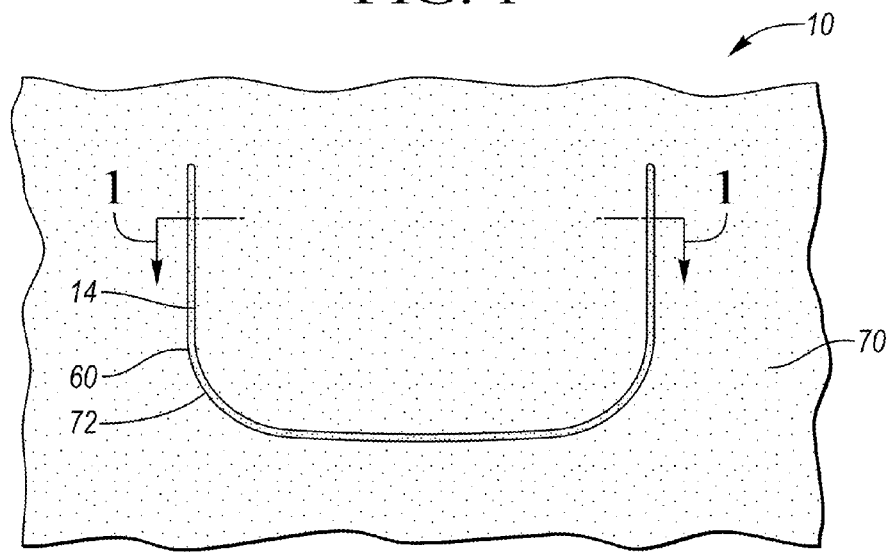
FIG. 2 is a schematic illustration in fragmentary back view of the trim component of FIG. 1.

After the foam layer 12 is sprayed on the inner skin layer 20, a substrate 70 is disposed on the foam layer 12. The substrate 70 is formed with a second gap 72. The second gap 72 extends completely through a thickness 74 of the substrate 70 and is aligned with and overlaps the first gap 14. The second gap 72 is generally in the same U-shape as the first gap 14 in the embodiment shown. In other words, the first gap 14 and the second gap 72 are coextensive. For example, the second gap 72 can be generally U-shaped, and can be substantially aligned with the first gap 14 when the substrate 70 is disposed on the foam layer 12, as shown in FIG. 2. The second gap 72 can be by a predetermined spray pattern, can be pressed, punched, molded, or otherwise provided in the substrate 70 dependent upon the materials and processes chosen to form the substrate 70, as described above.

The substrate 70 may comprise any suitable material or combination of materials for providing shape and/or structure to the trim component 10. For example, in some embodiments, the substrate 70 may comprise a natural fiber material, a plastic material, or combinations of natural fiber and plastic or similar materials. In some embodiments, the substrate 70 may be configured to be secured to one or more interior panel components of the vehicle 17 using one or more discrete and/or integral fasteners (not shown), thereby securing the trim component 10 in the vehicle 17.

The substrate 70 may be formed using a variety of suitable processes including, without limitation, injection molding, compression molding, vacuum compression molding, and/or the like. The foam layer 12 may be disposed on the substrate 70 by a variety of means dependent upon the material used for the substrate 70. For example, the substrate 70 can be bonded to the foam layer 12 using adhesive after the foam layer 12 has cured. Alternatively, the substrate 70 can be placed into contact with the foam layer 12 before the foam layer 12 has cured so that the uncured material of the foam layer 12 acts as a binder to secure the substrate 70 to the foam layer 12, with the foam layer 12 then curing to secure the substrate 70 in place with no added bonding adhesive required. In some embodiments, the foam layer 12 may be bonded to the substrate 70 using a mechanical compression process. In certain embodiments, heat may be introduced to the foam layer 12 and/or the substrate 70 prior to and/or during a mechanical bonding process. In other embodiments, the skin layer 16 and foam layer 12 may be bonded to the substrate 70 before removal from the tool 30. In other embodiments, the skin layer 16 and foam layer 12 may be bonded to the substrate 70 after removal from the tool 30 used to manufacture the skin layer 16 and foam layer 12.

The substrate 70 is formed or provided with the second gap 72 that may have substantially the same shape as the first gap 14. As shown in FIG. 1, the aligned first gap 14, second gap 72 and third gap 60 leave only the thinned portion 64 of the inner skin layer 20 and the outer skin layer 18 covering the U-shaped gaps 14, 72, 60. The outer skin layer 18 and thinned portion 64 at the gaps 14, 72, 60 are of lesser thickness and thus of reduced strength in comparison to the adjacent stacked skin layers 18, 20, foam layer 12, and substrate 70 having the combined thicknesses 35, 62, 48 and 74 in the remainder of the trim component 10. The trim component 10 can be installed on the vehicle 17 adjacent an air bag module 80, shown in hidden lines in FIG. 4 as it is mounted to the trim component 10 and/or to other support structure of the vehicle 17 near an inner surface 84 of the substrate 70 (indicated in FIG. 1) adjacent the predetermined tear pattern (i.e., adjacent the aligned gaps 14, 72, 60). An air bag 82 of the air bag module 80 folded in a stowed state in a housing of the air bag module 80 can then be deployed toward the trim component 10, tearing the trim component 10 at the predetermined tear pattern to enter the passenger compartment 15.

The first gap 14, second gap 60, and third gap 70 thus establish a stress concentration and resulting tear pattern at which the trim component 10 is likely to tear when a force is applied to the trim component 10 in a direction from the substrate layer 70 toward the skin layer 16. The first gap 14 and third gap 60 are provided during spraying of the foam layer 12 and the inner skin layer 20, respectively. The third gap 72 can also be provided during molding or otherwise forming the substrate 70.

Accordingly, once the skin layer 16, foam layer 12, and substrate 70 are assembled as described herein, the predetermined tear pattern is already provided at the aligned gaps 14, 60, 72, and no secondary cutting operation is required to provide a tear pattern, whether by way of mechanical cutting or laser cutting.

Figure 3:
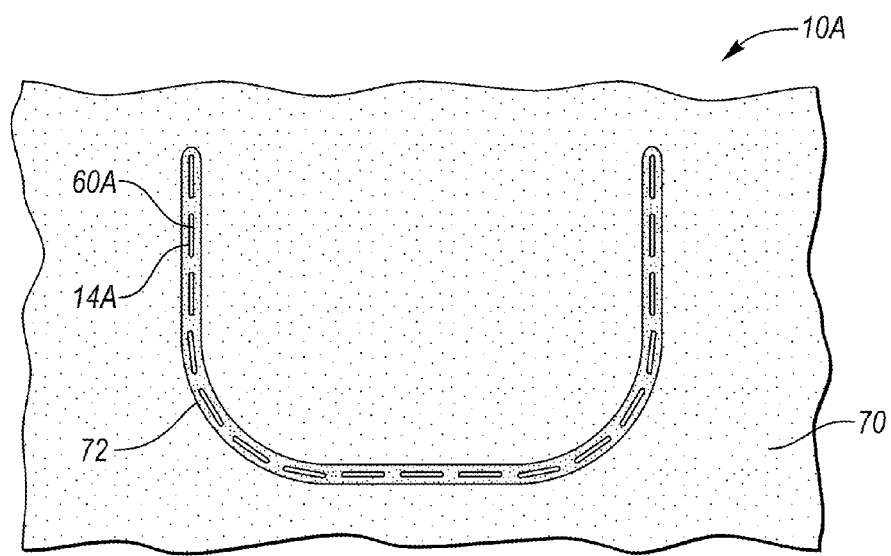
FIG. 3 is a schematic illustration in fragmentary back view of an alternate embodiment of a trim component in accordance with an alternative aspect of the present teachings.

FIG. 3 shows an alternative embodiment of a trim component 10A identical to the trim component 10 except that the first gap 14 and the third gap 60 are replaced with a series of first gaps 14A that are discontinuous, and the third gap 60 is replaced with a series of gaps 60A that overlap and are aligned with the first gaps 14A. The second gap 72 of the substrate 70 is the continuous, generally U-shaped gap of FIG. 1. The predetermined tear pattern can have other suitable shapes, and the U-shapes shown in FIGS. 2 and 3 are non-limiting examples.

FIG. 7 is a flow diagram of the method 100 of manufacturing the trim component 10 as described herein. The method 100 begins with step 102, forming the outer skin layer 18, which may be in the shape of the trim component 10 such as by spraying the outer skin layer 18 in the tool 30, or by any other suitable method described herein. Next, in step 104, the inner skin layer 20 is applied to the outer skin layer 18. Applying the inner skin layer 20 may be by spraying the inner skin layer 20 on the inner surface 24 of the outer skin layer 18 using the spray foam tool head 34, such as if the inner skin layer 20 is a spray urethane. Applying the inner skin layer 20 may be according to a second spray pattern as described herein to establish the third gap 60 with the thinned portion 64.

Next, in step 106, the foam layer 12 is sprayed on the inner skin layer 20 according to the first spray pattern P that establishes the first gap 14 arranged as a predetermined tear pattern. In step 106, the spray foam tool head 34 is controlled so that the first gap 14 is provided and is aligned and coextensive with the third gap 60.

In step 108, the substrate 70 is then disposed on the foam layer 12. Step 108 may include substantially aligning the second gap 72 of the substrate 70 with the first gap 14, and the second gap 72 may be substantially coextensive with the first gap 14. The outer skin layer 18 will extend across the first gap 14, the second gap 72, and the third gap 60 so that the predetermined tear pattern (i.e., the gaps 14, 60, 72) are not visible or otherwise apparent from the outer surface 22 of the outer skin layer 18.

The method 100 may also include step 110, installing the trim component 10 on a vehicle 17 so that an air bag module 80 is adjacent the predetermined tear pattern (i.e., the gaps 14, 60, 72) at the inner surface 84 of the substrate 70.

The detailed description and the drawings or figures are supportive and descriptive of the present teachings, but the scope of the present teachings is defined solely by the claims. While some of the best modes and other embodiments for carrying out the present teachings have been described in detail, various alternative designs and embodiments exist for practicing the present teachings defined in the appended claims.

The invention claimed is:

1. A method of manufacturing a trim component comprising:
   forming a skin layer of the trim component;
   spraying a foam layer on the skin layer according to a first spray pattern that establishes a first gap in the foam layer arranged as a predetermined tear pattern, wherein the skin layer extends across the first gap; and
   disposing a substrate on the foam layer to thereby at least partially align a second gap formed in the substrate with the first gap of the foam layer.

2. The method of claim 1, wherein said forming the skin layer includes:
   forming an outer skin layer of the trim component; and
   applying an inner skin layer to the outer skin layer.

3. The method of claim 2, wherein said applying the inner skin layer to the outer skin layer is by spraying the inner skin layer on the outer skin layer.

4. The method of claim 3, wherein said spraying the inner skin layer is according to a second spray pattern that establishes an additional gap in the inner skin layer; and
   wherein said spraying the foam layer is so that the first gap in the foam layer at least partially aligns with the additional gap in the inner skin layer.

5. The method of claim 1, wherein said disposing a substrate on the foam layer further comprises at least partially aligning the second gap formed in the substrate with the first gap of the foam layer such that the first gap and the second gap are substantially coextensive.

6. A trim component comprising:
   a skin layer having an outer surface and an inner surface opposite the outer surface;
   a foam layer sprayed on the inner surface of the skin layer according to a predetermined spray pattern so that the foam layer has a first gap arranged as a predetermined tear pattern; and wherein the skin layer extends across the first gap; and
   a substrate on the foam layer so that the foam layer is between the skin layer and the substrate; and wherein the substrate has a second gap that is at least partially aligned with the first gap.

7. The trim component of claim wherein the first gap and the second gap are substantially coextensive.

8. The trim component of claim 6, wherein the skin layer has an outer skin layer and an inner skin layer; wherein the inner skin layer is a foam sprayed on the outer skin layer so that the inner skin layer has a third gap that is at least partially aligned with the first gap.

9. The trim component of claim 8, wherein the first gap and the third gap are substantially coextensive.

10. The trim component of claim 8, wherein the first gap extends through the foam layer to the inner skin layer; and wherein the third gap extends only partway through the inner skin layer to establish a thinned portion of the inner skin layer.

11. The trim component of claim 6, wherein the first gap is arranged as a U-shaped air bag door tear pattern.

12. The trim component of claim 11, wherein the trim component is a vehicle instrument panel.

13. A vehicle comprising:
   a trim component having:
      a skin layer having an outer surface and an inner surface opposite the outer surface;
      a foam layer sprayed on the inner surface of the skin layer according to a predetermined spray pattern so that the foam layer has a first gap arranged as a predetermined air bag door tear pattern; wherein the skin layer extends across the first gap; and
      a substrate on the foam layer so that the foam layer is between the skin layer and the substrate; and wherein the substrate has a second gap that is at least partially aligned with the first gap; and
   an air bag module having a deployable air bag; and wherein the air bag module is positioned adjacent the trim component so that the deployable air bag deploys through the vehicle trim component by tearing the vehicle trim component at the first gap.

14. The vehicle of claim 13, wherein the skin layer has an outer skin layer and an inner skin layer; wherein the inner skin layer is a foam sprayed on the outer skin layer so that the inner skin layer has a third gap at least partially aligned with the first gap.

15. The vehicle of claim 14, wherein the first gap and the third gap are substantially coextensive.

16. The vehicle of claim 4, wherein the first gap extends through the foam layer to the inner skin layer; and wherein the third gap extends only partway through the inner skin layer to establish a thinned portion of the inner skin layer.

17. The vehicle of claim 13, wherein the first gap is arranged as a U-shaped air bag door tear pattern.

18. The vehicle of claim 13, wherein the trim component is a vehicle instrument panel.

* * * * *